(12) United States Patent
Connolly et al.

(10) Patent No.: US 8,738,256 B2
(45) Date of Patent: May 27, 2014

(54) AUTOMATIC CALIBRATION OF THE TORQUE TRANSFER TOUCH POINT IN AN ELECTRICALLY ACTUATED CLUTCH IN A HYBRID VEHICLE

(75) Inventors: Thomas R. Connolly, Portage, MI (US); George A. Brunemann, Cincinnati, OH (US); Matthew P. Johnson, Portage, MI (US)

(73) Assignee: Eaton Corporation, Cleveland, OH (US)

( * ) Notice: Subject to any disclaimer, the term of this patent is extended or adjusted under 35 U.S.C. 154(b) by 1481 days.

(21) Appl. No.: 12/166,274

(22) Filed: Jul. 1, 2008

(65) Prior Publication Data

US 2010/0004837 A1    Jan. 7, 2010

(51) Int. Cl.
   *B60W 10/02*    (2006.01)
   *G06F 17/00*   (2006.01)
   *G06F 19/00*   (2011.01)

(52) U.S. Cl.
   USPC ............. 701/68; 701/33.1; 477/176; 477/179

(58) Field of Classification Search
   USPC ........ 701/36, 48, 51, 52, 58, 64, 66–68, 29.1, 701/33.1; 477/166, 174–176, 179–180; 180/65.1, 65.21, 65.22, 65.265, 65.27, 180/65.275
   See application file for complete search history.

(56) References Cited

U.S. PATENT DOCUMENTS

| | | | |
|---|---|---|---|
| 4,081,065 A | 3/1978 | Smyth et al. | |
| 4,361,060 A | 11/1982 | Smyth | |
| 4,527,447 A | 7/1985 | Richards | |
| 4,638,898 A | 1/1987 | Braun | |
| 4,646,891 A | 3/1987 | Braun | |
| 4,648,290 A | 3/1987 | Dunkley et al. | |
| 4,714,144 A | 12/1987 | Speranza | |
| 4,873,637 A | 10/1989 | Braun | |
| 4,899,858 A | 2/1990 | Cote et al. | |
| 5,275,267 A | 1/1994 | Slicker | |
| 5,293,316 A | 3/1994 | Slicker | |
| 5,314,050 A | 5/1994 | Slicker et al. | |
| 5,316,116 A | 5/1994 | Slicker et al. | |
| 5,337,868 A * | 8/1994 | Liu et al. | 477/74 |
| 5,337,874 A | 8/1994 | Oltean et al. | |
| 5,378,211 A * | 1/1995 | Slicker et al. | 477/175 |
| 5,393,274 A * | 2/1995 | Smedley | 477/74 |
| 5,624,350 A | 4/1997 | Bates | |
| 5,810,143 A | 9/1998 | Weidinger | |
| 5,993,355 A * | 11/1999 | Nordgård | 477/174 |
| 6,022,295 A * | 2/2000 | Liu | 477/180 |

(Continued)

FOREIGN PATENT DOCUMENTS

EP    1 002 687 A2    5/2000

*Primary Examiner* — Thomas Tarcza
*Assistant Examiner* — Edward Pipala
(74) *Attorney, Agent, or Firm* — Rader, Fishman & Grauer PLLC (57) ABSTRACT

A method of determining a torque transfer touch point of a clutch within a drive train includes applying a predetermined amount of current to an electric motor such that the electric motor will apply a torque to at least a portion of a clutch. The predetermined amount of current will not rotate a shaft of the motor when the clutch is at least partially engaged. The method also includes initiating disengagement of the clutch, detecting movement of at least a portion of the motor, and recording a clutch parameter that is generally coincident with the detecting movement of a least a portion of the motor.

20 Claims, 5 Drawing Sheets

(56) References Cited

U.S. PATENT DOCUMENTS

| | | | |
|---|---|---|---|
| 6,079,535 A * | 6/2000 | Mueller et al. | 192/48.2 |
| 7,151,990 B2 * | 12/2006 | Eich et al. | 701/51 |
| 2009/0292432 A1 * | 11/2009 | Suzuki et al. | 701/68 |
| 2010/0000835 A1 * | 1/2010 | Connolly et al. | 192/31 |
| 2010/0004092 A1 * | 1/2010 | Glatthaar et al. | 477/109 |
| 2010/0048351 A1 * | 2/2010 | Sayman | 477/80 |

* cited by examiner

AUTOMATIC CALIBRATION OF THE TORQUE TRANSFER TOUCH POINT IN AN ELECTRICALLY ACTUATED CLUTCH IN A HYBRID VEHICLE

TECHNICAL FIELD

The disclosure generally relates to vehicular clutches and specifically to determining a torque transfer touch point of a vehicular clutch.

BACKGROUND

Vehicular automated mechanical transmission systems comprising a multiple-speed mechanical transmission drivingly connected to a fuel-controlled engine by means of an automatically actuated vehicle master friction clutch are well known in the prior art, as may be seen by reference to U.S. Pat. Nos. 4,081,065; 4,361,060; 4,527,447; 4,638,898; 4,648,290; 4,714,144; 4,873,637; 5,275,267; 5,293,316; 5,314,050 and 5,316,116, the disclosures of which are incorporated herein by reference.

To improve the controllability and responsiveness of the prior art master clutch control systems, one may determine a clutch control parameter value, such as a clutch actuator position, which corresponds to the "torque transfer touch point" or "point of incipient engagement" of the clutch, i.e., that point or position during engagement of the master clutch at which the master clutch just began to transmit torque. The clutch torque transfer touch point may be determined or calibrated during a system startup routine and subject to updating during ongoing vehicle operations, as disclosed in U.S. Pat. Nos. 5,393,274 and 6,022,295, the disclosures of which are incorporated herein by reference.

During a controlled master clutch engagement, a moveable clutch plate of the master clutch may be moved rapidly from its disengaged position toward a fixed clutch plate (and may compress a number of clutch disks between the plates) to a point just prior to the torque transfer touch point, and then further moved toward the fixed clutch plate in a controlled, modulated manner according to the applicable clutch control logic. Examples of such clutch control logic may be seen by reference to U.S. Pat. Nos. 4,646,891; 4,899,858 and 5,337,874, the disclosures of which are incorporated herein by reference. One reason for not maintaining the moveable clutch plate and the fixed clutch plate in a clutch position just prior to the torque transfer touch point is that this clutch position may result in an inadvertent transfer of torque between the moveable clutch plate and the fixed clutch plate and may result in a frictional shear (especially in a wet clutch) as the plates and/or friction disks of a clutch rotate within a sufficiently close axial distance to undesirably heat the clutch. Heating of a clutch may reduce clutch life, increase wear, and reduce the amount of torque that may be transferred therethrough.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are exemplary and are not intended to be exhaustive or otherwise limit or restrict the claims to the precise forms and configurations shown in the drawings and disclosed in the following detailed description.

DETAILED DESCRIPTION

Figures 1, 3:
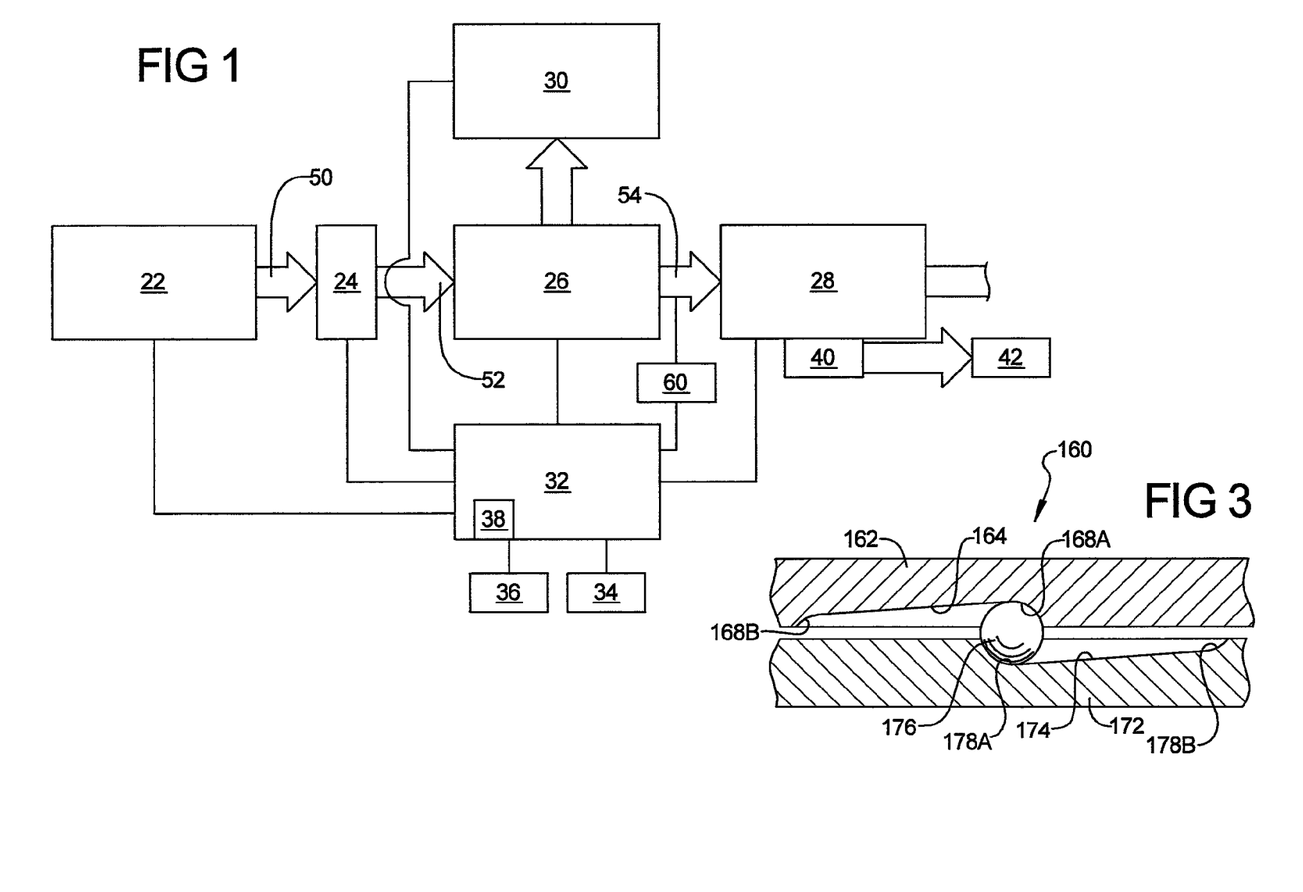
FIG. 1 is a schematic of a hybrid vehicle drive train system, according to an embodiment.
FIG. 3 is a partial sectional view taken along line 3-3 of FIG. 2.

FIG. 1 illustrates a hybrid vehicle drive train system 20. The hybrid vehicle drive train system 20 includes an internal combustion engine 22, a clutch assembly 24, a motor 26, a multi-ratio transmission 28, a battery 30, a controller 32, a user interface 34, and an ignition 36. The controller 32 may include a memory 38. The system 20 may also include a power take off (PTO) 40 and a PTO powered device 42. In one embodiment, the motor 26 is an electric motor configured to rotate at least a portion of the clutch assembly 24. The controller 32 may be a processor or microprocessor configured for detecting parameters and providing outputs as discussed in greater detail herein. The ignition 36 is used for starting the engine 22 and the motor 26, although the controller 32 may be operational and perform functions even with the ignition in an off configuration, as discussed in greater detail below.

The engine 22 includes an output engine shaft 50 and the motor 26 includes a motor input shaft 52 and the transmission 28 includes a transmission input shaft 54. The system 20 also includes a transmission input shaft speed sensor 60. Generally, the motor input shaft 52 is coupled for rotation with the transmission input shaft 54 such that the transmission input shaft speed sensor 60 will detect movement of the motor input shaft 52.

Figure 2:
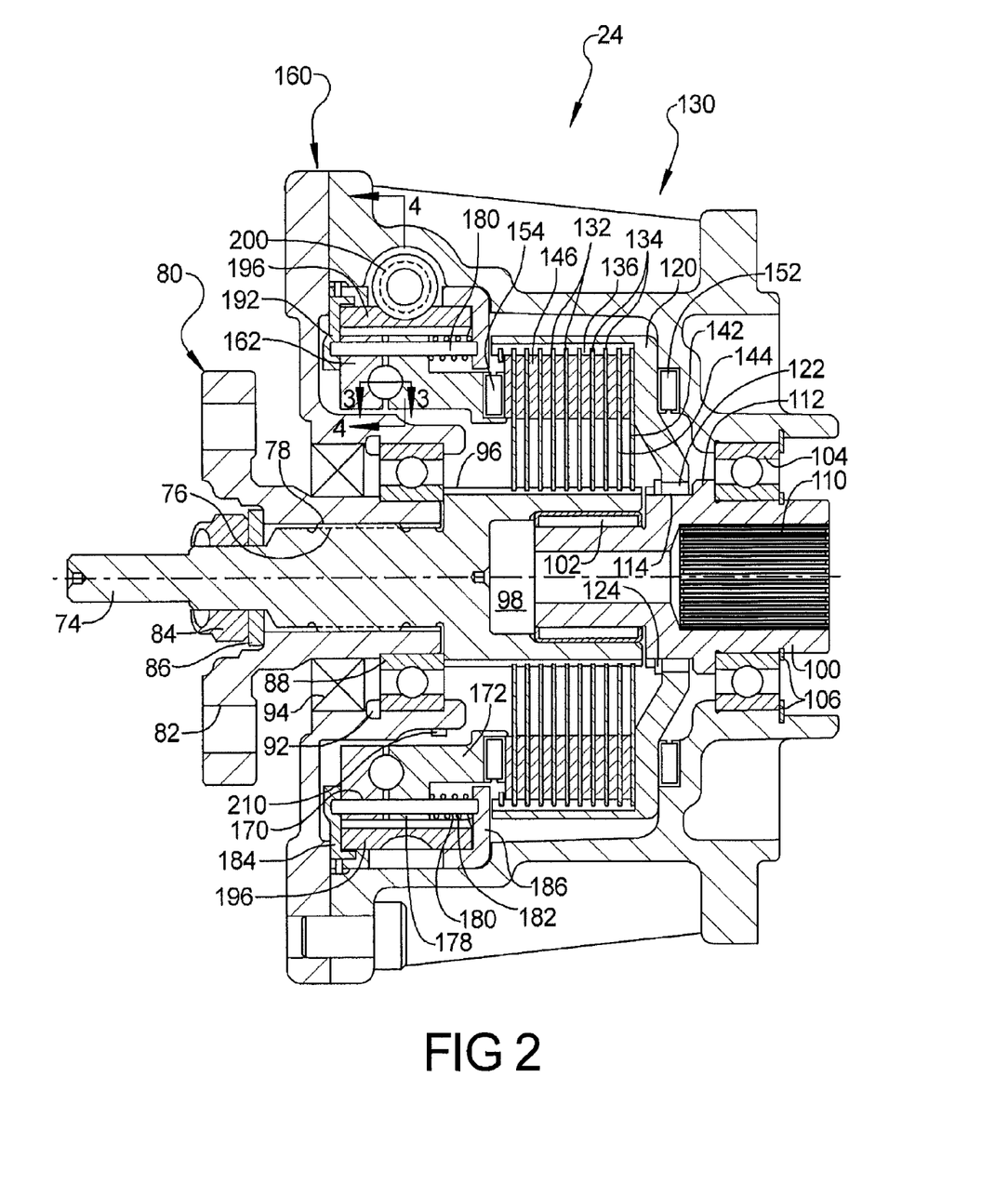
FIG. 2 is a partial sectional view of a clutch, according to an embodiment.

Referring now to FIG. 2, the clutch assembly 24 includes a preferably cast, two component housing 72 which includes various apertures, recesses, shoulders, and the like which receive, position and support various components and sub assemblies of the clutch assembly 24. An input shaft 74 includes an enlarged diameter threaded portion having external or male splines 76 which are complementary to and engaged by internal female splines 78 formed on the interior portion of an input flange 80. The input flange 80 includes through axial passageways 82 which may receive fasteners or components, for example, of the universal joint 34, illustrated in FIG. 1. The input flange 80 is secured to and retained upon the input shaft 74 by a threaded fastener such as a nut 84 and a flat washer 86. The input shaft 74 and the flange 80 are positioned and supported by an antifriction bearing such as a ball bearing assembly 88 which is retained within the housing by a snap ring 92. An oil seal 94 extends between the exterior surface of the input flange 80 and the housing 72 and inhibits the passage of clutch fluid from within the housing 72 and contaminants into the housing 72. The input shaft 74 includes a plurality of external or male splines or gear teeth 96.

The input shaft 74 also includes a counterbore 98 which receives a portion of an output shaft 100. A reduced diameter portion of the output shaft 100 which is received within the counterbore 98 supports and is supported by a roller bearing assembly 102. An antifriction bearing such as a roller bearing assembly 104 freely rotatably supports the output shaft 100 within the housing 72. The ball bearing assembly 104 and the output shaft 100 are axially positioned and retained by a pair of snap rings 106. The output shaft 100 includes a set of internal or female splines 110 which may engage and drive components (not illustrated) within the rear differential assembly 36, illustrated in FIG. 1.

The output shaft 100 defines a shoulder 112 between the ball bearing assembly 104 and a region of external or male splines or gear teeth 114. An output bell housing, or axially fixed plate, 120 includes a smaller diameter region of internal or female splines 122, which are complementary to and engage the male splines 114 on the output shaft 100. Thus, the output bell housing 120 rotates with the output shaft 100. A snap ring 124 maintains the output bell housing 120 in a proper axial position on the output shaft 100 adjacent the shoulder 112 and engaged with the male splines 114.

The clutch assembly 24 also includes a multiple plate friction clutch pack assembly 130. The friction clutch pack assembly 130 includes a first plurality of larger diameter friction clutch plates or discs 132 having a plurality of male or external splines 134 which are complementary to and engage internal or female splines 136 on the inner surface of the output bell housing 120. Thus, the first plurality of clutch plates or discs 132 rotates with the output bell housing 120 and the output shaft 100. Interleaved with the first plurality of clutch plates 132 is a second plurality of smaller diameter friction clutch plates or discs 142. The second plurality of smaller diameter friction clutch plates or discs 142 includes internal or female splines 144 which are complementary to and engage the male splines 96 on the input shaft 74. Thus, the second plurality of clutch plates or discs 142 rotate with the input shaft 74. It will be appreciated that appropriate, adjacent surfaces of the friction clutch plates or discs 132 and 142 include clutch paper or friction material 146, which provides suitable frictional coupling between the clutch plates or discs 132 and 142 when they are compressed.

A first roller thrust bearing assembly 152 is disposed between the output bell housing 120 and the housing 72 and a second roller thrust bearing assembly 154 is disposed between the opposite end of the friction clutch pack 130 and a ball ramp operator assembly 160.

Figure 4:
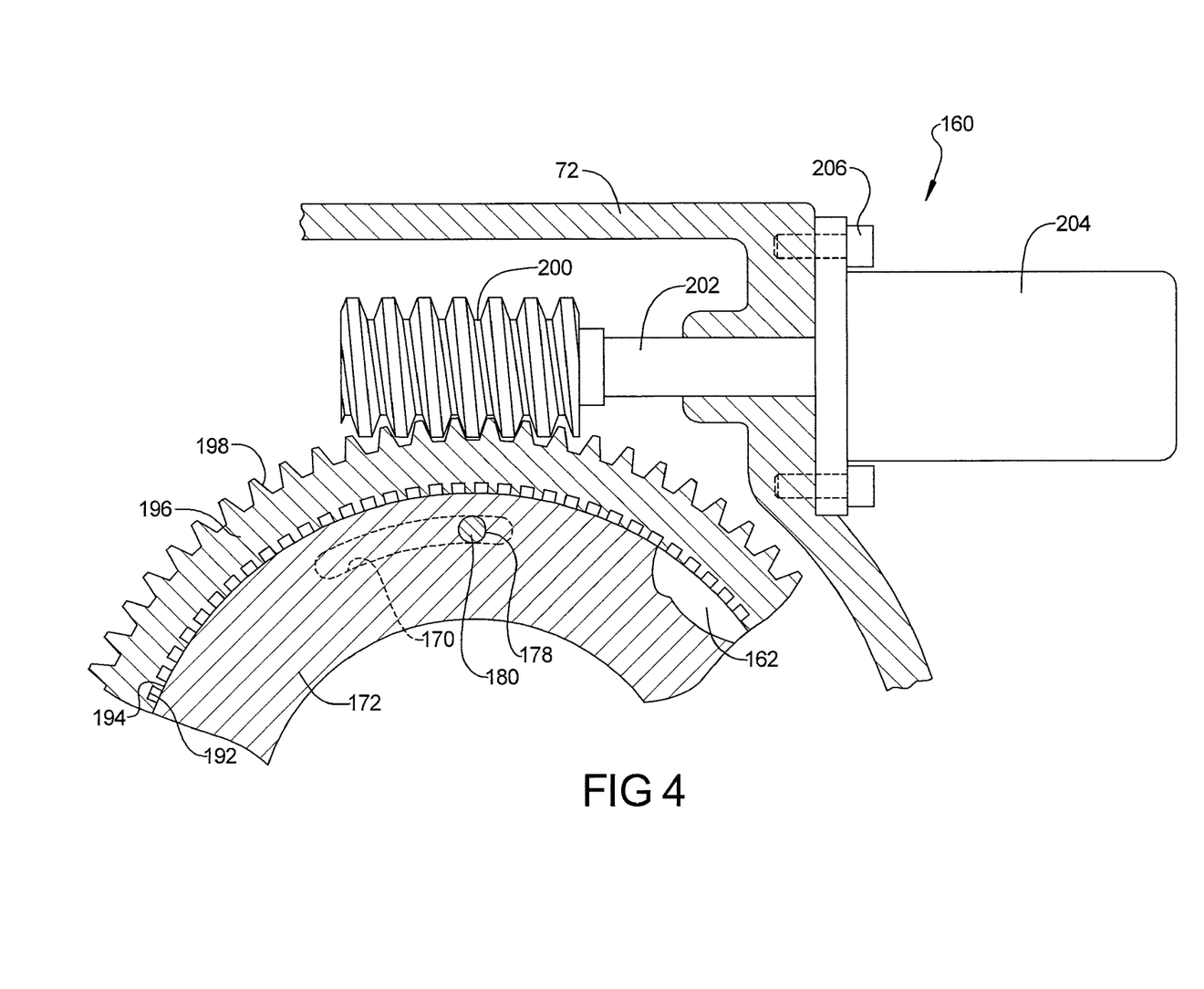
FIG. 4 is a partial sectional view taken along line 4-4 of FIG. 2.

Referring now to FIGS. 2, 3 and 4, the ball ramp operator assembly 160 includes a first, rotatable member 162 which includes a plurality of unidirectionally ramped recesses 164 defining a deep cupped end 168A and a shallow cupped end 168B. In one exemplary approach there may be three recesses 164. The first rotatable member 162 also includes a plurality of arcuate slots 170. Adjacent the first rotatable member 162 is a second, non-rotatable, axially moveable member, or axially moveable plate, 172. The second, axially moveable member 172 includes a like plurality of, again, unidirectionally ramped recesses 174 similarly having a deep cupped end 178A and a shallow cupped end 178B. In one exemplary approach there may be three such recesses 174. In the relaxed position of the clutch assembly 70, the deep cupped ends 168A and 178A of the first and second members 162 and 172, respectively, are adjacent one another and receive load transferring members such as ball bearings 176. The cupped ends 168A, 168B, 178A and 178B of the ramped recesses 164 and 174 ensure retention of the ball bearings 176.

The second, axially moveable member 172 includes a plurality of through holes or apertures 178 that may receive a like plurality of register pins 180 extending through the arcuate slots 170 of the first member 162. Disposed about the register pins 180 along their portions extending beyond the second member 172 are compression springs 182, which provide a biasing or restoring force which urges the second member 172 to the left, as illustrated in FIG. 2, to relax compression of the friction clutch pack assembly 130. The ends of the register pins are received and retained within stationary circular frames 184 and 186. Thus, the register pins 180 are stationary and inhibit rotary motion of the second moveable member 172 while permitting it to axially translate.

It will be appreciated that the recesses 164 and 174 and the load transferring members 176 may be replaced with other analogous mechanical elements, which cause axial displacement of the second, moveable member 172 in response to relative rotation therebetween. For example, tapered rollers disposed in complementarily configured conical helices or cam plates having a plurality of opposed, complementary oblique surfaces may be utilized.

An important design consideration of the recesses 164 and 174 and the load transferring members 176 is that their geometry and the overall design and clearances of the ball ramp operator assembly 160 ensure that the clutch assembly 70 is not self-engaging. The clutch assembly 24 must not self-engage, but rather must be capable of modulating clamping of the friction clutch pack assembly 130 in direct, proportional response to the signal provided by the controller or controller 32.

Referring now to FIGS. 2 and 4, the outer periphery if the first member 162 includes male or external splines or gear teeth 192 which are complementary to and engage internal or female splines or gear teeth 194 on an annular drive ring or collar 196. The annular drive ring or collar 196 includes external gear teeth 198, which are engaged and driven by a worm gear 200. The worm gear 200 is secured to a driveshaft 202, which is driven by a bi-directional clutch engaging motor 204 which is, in turn, secured to the housing 72 by a plurality of threaded fasteners 206. The bi-directional electric motor is driven by an output of the controller 32.

In operation, as the driveshaft 202 of the bi-directional clutch engaging motor 204 rotates, typically upon a command from the controller 32, the ring gear 196 rotates about its axis at a greatly reduced speed. As it rotates, it rotates the first, rotatable member 162 thereby causing the ball bearings 176 to roll up the ramps 164 and 174 and translate the second member 172 toward the friction clutch pack assembly 130 and the axially fixed plate 120. Compression of the friction clutch pack assembly 130 between the second member 172 and the axially fixed plate 120 transfers torque from the input shaft 74 to the output shaft 100 (i.e. the clutch 24 is engaged). It will be appreciated that because of the anti-backdrive characteristics of the worm gear 200 and the teeth 198 of the ring gear 196, cessation of motion of the clutch engaging motor 204 will result in maintenance of the compression of the friction clutch pack 130 and maintenance of the level of torque throughout.

During clutch 24 engagement, the clutch position, or relative position between the second member 172 and the axially fixed plate 120 may be monitored by a moveable plate axial position detector 210 that is operably connected to the controller 32. The moveable plate axial position detector 210 is positioned within the clutch 24 so as to detect the position of the moveable clutch plate 172 during clutch engagement.

Typically during engagement of the clutch 24, the controller 32 will rotate the driveshaft 202 of the clutch engaging motor 204 at a high rate of rotational speed until just prior to the torque transfer touch point (the clutch position where the compression of the friction clutch pack assembly 130 between the second member 172 and the axially fixed plate 120 will begin to transfer torque from the input shaft 74 to the output shaft 100). Then the controller 32 will rotate the driveshaft 202 of the clutch engaging motor 204 at a lower rate of rotational speed so as to compress the friction clutch pack assembly 130 between the second member 172 and the axially fixed plate 120 in a controlled manner that will result in a desirable rate of clutch engagement. In this manner, the clutch 24 may be engaged in a controlled manner to prevent an undesired "jerk" engagement while not delaying the time required for an engagement.

As the clutch engaging motor 204 is commanded to rotate in the opposite direction by the controller 32 or other controller, the ring gear 96 and first member 162 likewise rotate in a direction which releases pressure on the friction clutch pack assembly 130, such pressure release aided by the compression springs 182, which urge the second member 172 to the left, to the relaxed position illustrated in FIGS. 2 and 3 (i.e. the clutch 24 is disengaged). Accordingly, the current applied to the clutch engaging motor 204 will engage or disengage the clutch 24.

The input shaft 74 of the clutch 24 is coupled for rotation with the output engine shaft 50 (FIG. 1), and the motor input shaft 52 (FIG. 1) is coupled for rotation with the clutch output shaft 100.

Figure 5:
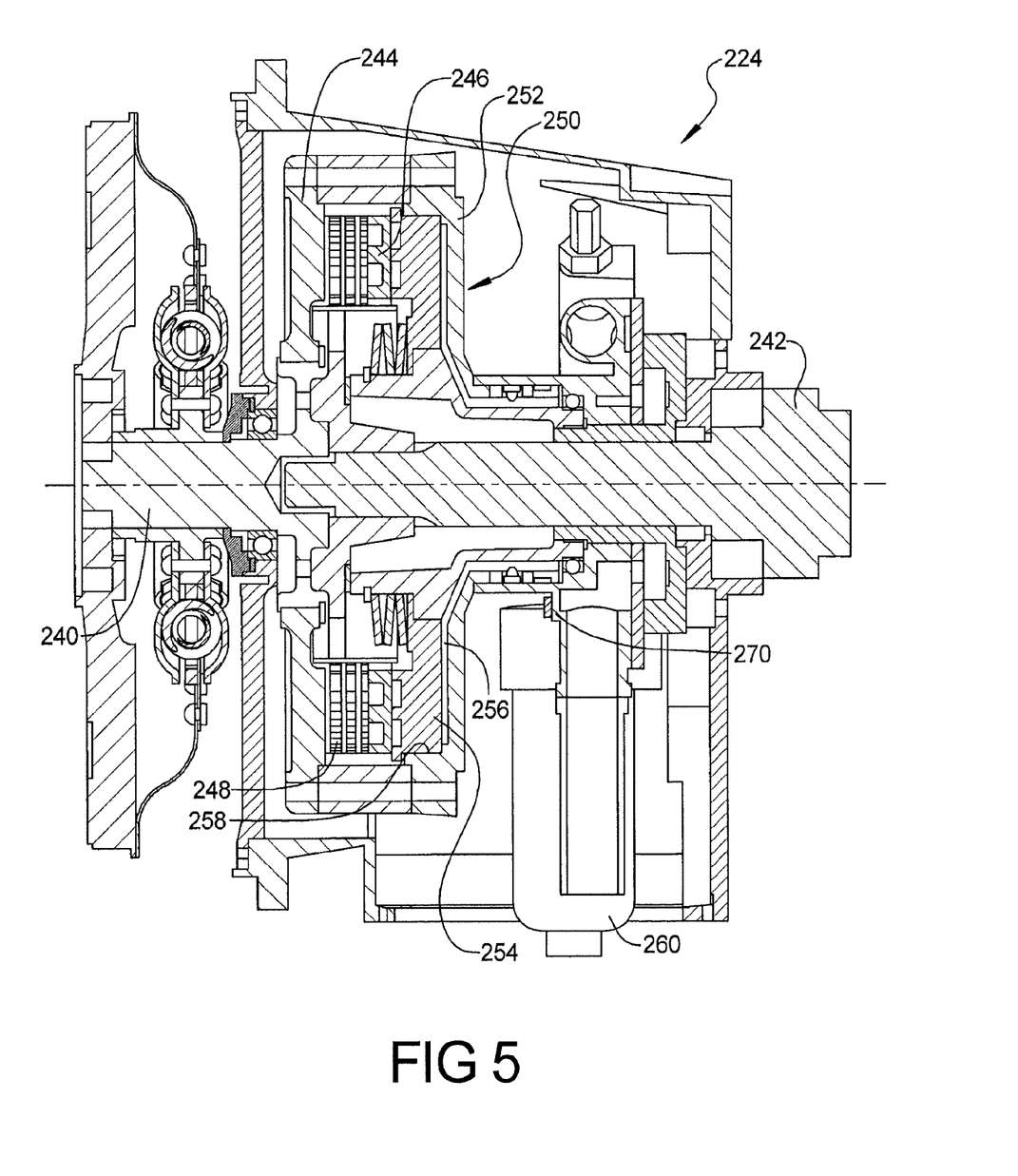
FIG. 5 is a partial sectional view of a clutch, according to an embodiment

As best seen in FIG. 5, the clutch assembly 24 is illustrated in an alternative embodiment as a hydraulically actuated clutch 224. The clutch 224 includes an input portion 240, an output portion 242, a fixed plate 244, a moveable plate 246, and at least one friction disk 248. In the exemplary illustration, the clutch 224 is an "automatic clutch" that is operated by the controller 32 to control engagement and disengagement. That is, the controller 32 will control movement of the moveable plate 246 relative to the fixed plate 244. Further, the moveable plate 246 is illustrated adjacent a piston assembly 250, although other assemblies (such as a ball ramp) for axially moving the moveable plate 246 relative to the fixed plate 244 may be used. The input portion 240 is operably coupled to the output shaft of the engine 22, and the output portion 242

The piston assembly 250 includes a piston housing 252, a piston 254, and a piston chamber 256. A pressure supply system, partially illustrated at 260, for supplying a pressurized fluid to the piston chamber 256. The piston housing 252 includes a generally annular piston cylinder portion 258 to permit the piston 256 to move axially relative thereto. The system 260 may supply in a pulse-width fashion, for example, to control the axial distance of the moveable plate 246 relative to the fixed plate 244.

During clutch 224 engagement, the clutch position, or relative position between the moveable plate 246 and the axially fixed plate 244 may be monitored by a moveable plate axial position detector 270 that is operably connected to the controller 32. The moveable plate axial position detector 270 is positioned within the clutch 224 so as to detect the position of the moveable plate 246 during clutch engagement. Accordingly, the moveable plate 246 may be moved relative to the axially fixed plate 244 by the controller 32 as the controller 32 monitors and detects their relative position.

Figure 6:
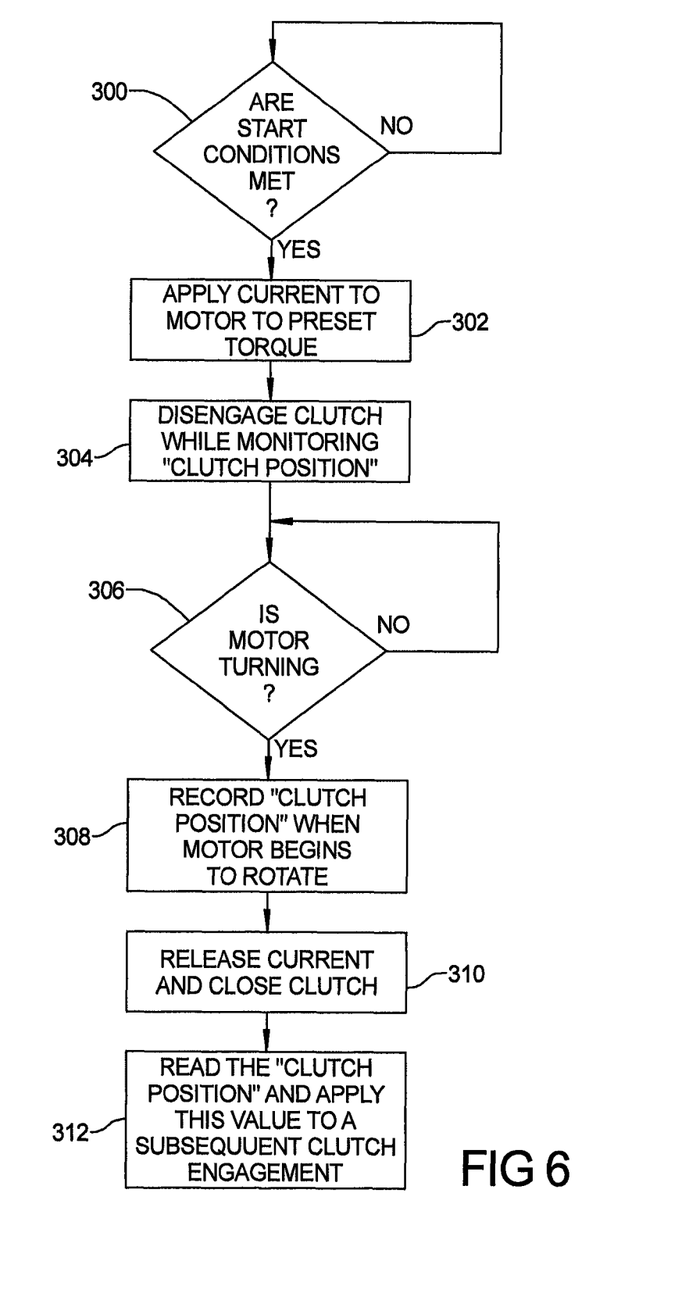
FIG. 6 is a flow chart illustrating steps of a method according to an embodiment.

FIG. 6 illustrates one embodiment of operation of the system 20. In step 300, a computer processor such as that which may be associated with controller 32 determines whether the start conditions for the operation are met. These start conditions may include the ignition 36 for the vehicle in an off configuration where the engine 22 will not start, the engine 22 speed being about zero, the transmission 28 being in a neutral configuration, speed of the transmission input shaft 54 being about zero, and the clutch 24 being closed (engaged). If the start conditions are met, then the method proceeds to step 302, if the start conditions are not met, then the method returns to step 300.

In step 302, the controller 32 will apply current to the motor 26. This current will preset a torque on the motor input shaft 52 that will bias the motor input shaft 52 to rotate. The motor input shaft 52 is prevented from rotating by the clutch 24 (which is engaged) and the engine 22, which will resist rotation. The engine 22 may resist rotation due to the compression of cylinders (not shown). In one exemplary approach, the amount of current applied will be just enough to rotate the motor input shaft 52 when the clutch 24 is disengaged (not transferring torque between the input shaft 74 to the output shaft 100). Then the method proceeds to step 304.

In step 304, the controller 32 will begin to disengage the clutch. This disengagement may be coincident with monitoring the "clutch position", or the clutch position may be detected only when the motor has moved. Then the method proceeds to step 306.

In step 306, the controller 32 determines when the motor 26 is moving. In one embodiment, the controller 32 will monitor the transmission input shaft speed sensor 60, although other detections may be used, such as detecting a change in current draw of the motor 26, may be used. When the detection is made, the method proceeds to step 308, if the detection is not made, then the method returns to step 306.

In step 308, the value of the clutch position is recorded in the memory 38. The controller 32 may apply this clutch position as a newly acquired torque transfer touch point. In one example, the value of the clutch position is recorded by the controller 32 in an internal memory. In one embodiment, the clutch position is the axial distance between the fixed plate and the moveable plate. In other exemplary embodiments the clutch position is detected in terms of detecting movement or position of other components (such as the driveshaft 202 or the piston 254) or other parameters (such as the amount of fluid displaced by the system 260). Then the method proceeds to step 310.

In step 310, the controller 32 will return the system 20 generally to the start conditions by releasing the current on the motor 26 and closing (engaging) the clutch 24. Then the method proceeds to step 312.

In step 312, the controller will read the clutch position and apply this value during a subsequent clutch 24 engagement. The controller 32 may perform this method at predetermined intervals, or may detect that the time for clutch engagement has increased beyond a desirable time period, and automatically perform the method. Therefore, as the clutch wears or as portions of the clutch may undesirably fall out of orientation, the system 20 may adjust the clutch for shifting with an updated torque transfer touch point.

The controller 32 may engage and disengage the clutch 24 without human intervention. That is, no individual human input is needed for the controller 32 to engage or disengage the clutch 24, as the controller 32, or other device, may automatically initiate the engagement or disengagement.

Although the steps of the method of operating the system 20 are listed in a preferred order, the steps may be performed in differing orders or combined such that one operation may perform multiple steps. Furthermore, a step or steps may be initiated before another step or steps are completed, or a step or steps may be initiated and completed after initiation and before completion of (during the performance of) other steps.

Generally, the clutch position will be detected as the motor 26 begins to rotate, or within some acceptable time after the motor 26 begins to rotate. Since the detected clutch position corresponds to the complete disengagement of the clutch (no torque is transferred), then the detected clutch position may be used as a starting point for a controlled (slow) engagement of the clutch after the clutch has been brought to the detected clutch position in a relatively fast manner.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A method for detecting a clutch engagement position of a clutch engageable in a fully engaged state with and disengageable in a disengaged state from a motor input shaft of an electric motor, the method comprising the steps of:
    engaging the clutch in the fully engaged state with the motor input shaft of the electric motor in response to a command from a controller;
    applying an amount of current to the electric motor, wherein the amount of current will not rotate the motor input shaft of the motor when the clutch is in the fully engaged state with the motor input shaft;
    relaxing the clutch from the fully engaged state towards the disengaged state;
    detecting movement that is indicative of rotation of the motor input shaft of the electric motor as the clutch relaxes from the fully engaged state towards the disengaged state; and
    detecting the clutch engagement position of the clutch that is generally coincident with the step of detecting movement.

2. The method of claim 1, wherein disengaging the clutch includes applying current to an electric clutch engaging motor.

3. The method of claim 1, further comprising recording a value indicative of the clutch engagement position.

4. The method of claim 3, wherein the clutch engagement position is indicative of a torque transfer touch point.

5. The method of claim 3, further comprising applying the value indicative of the clutch engagement position during a subsequent clutch engagement.

6. The method of claim 5, further comprising moving a moveable disk of the clutch toward a fixed disk of the clutch at a first predetermined speed prior until the clutch is in about the clutch engagement position, and thereafter moving the moveable disk of the clutch toward the fixed disk of the clutch at a second predetermined speed to engage the clutch, wherein the first predetermined speed is greater than the second predetermined speed.

7. The method of claim 1, wherein detecting movement includes receiving an input from a transmission input shaft speed sensor.

8. The method of claim 1, further comprising a drive train and a step of detecting a predetermined configuration of the drive train prior to applying the amount of current to the electric motor.

9. The method of claim 8, wherein the predetermined configuration of the drive train includes one of: the speed of a transmission shaft being about zero, the clutch being closed, the transmission in a neutral configuration, the engine speed being about zero, and an ignition being in an off configuration.

10. A method of determining a torque transfer touch point of a clutch engageable in a fully engaged state with and disengageable in a disengaged state from a motor input shaft of an electric motor, the method comprising the steps of:
    engaging the clutch in the fully engaged state with the motor input shaft of the electric motor in response to a command from a controller;
    applying a predetermined amount of current to the electric motor such that the electric motor is applying a torque to at least a portion of a clutch, wherein the predetermined amount of current will not rotate the motor shaft of the electric motor when the clutch is in the fully engaged state with the motor input shaft;
    relaxing the clutch from the fully engaged state towards the disengaged state;
    detecting movement indicative of rotation of the motor input shaft of the electric motor as the clutch relaxes from the fully engaged state towards the disengaged state; and
    recording a clutch parameter that is generally coincident with the detecting movement step.

11. The method of claim 10, further comprising a drive train and a step of detecting a predetermined configuration of the drive train prior to applying the predetermined amount of current to the electric motor.

12. The method of claim 11, wherein the predetermined configuration of the drive train includes one of: the speed of a transmission shaft being about zero, the clutch being closed, the transmission in a neutral configuration, the engine speed being about zero, and an ignition being in an off configuration.

13. The method of claim 10, wherein the clutch parameter is indicative of a torque transfer touch point.

14. The method of claim 13, further comprising applying the clutch parameter during a subsequent clutch engagement.

15. The method of claim 14, further comprising moving a moveable disk of the clutch toward a fixed disk of the clutch at a first predetermined speed prior until the clutch is at about the torque transfer touch point, and thereafter moving the moveable disk of the clutch toward the fixed disk of the clutch at a second predetermined speed to engage the clutch, wherein the first predetermined speed is greater than the second predetermined speed.

16. The method of claim 10, further comprising a step of preventing rotation of at least a portion of the clutch with an internal combustion engine operably coupled to the at least a portion of the clutch.

17. A system for determining a torque transfer touch point of a clutch comprising:
    a clutch operably positioned between a fuel controlled engine and an electric motor to move to and between a fully engaged state to connect the fuel controlled engine and the electric motor and a disengaged state to disconnect the fuel controlled engine and the electric motor;
    a power input for supplying current to the electric motor;

a clutch operator configured to move the clutch without human intervention to and between the fully engaged state and the disengaged state;

a detector configured for detecting a clutch position representative of the torque transfer touch point at the time when the electric motor begins to rotate while the clutch operator relaxes the clutch from the fully engaged state towards the disengaged state; and a memory for recording a value indicative of the clutch position.

18. The system of claim 17, further comprising a processor configured to apply the detected clutch position during a subsequent clutch engagement.

19. The system of claim 17, further comprising an electrically controlled device for engaging the clutch.

20. The system of claim 17, further comprising a detector for detecting movement of at least a portion of the electric motor.

* * * * *